(12) United States Patent
Glackin et al.

(10) Patent No.: US 8,548,900 B1
(45) Date of Patent: Oct. 1, 2013

(54) FPGA MEMORY PAGING

(71) Applicants: Brendan Glackin, Letterkenny (IE);
Glenn McClements, Belfast (GB)

(72) Inventors: Brendan Glackin, Letterkenny (IE);
Glenn McClements, Belfast (GB)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 13/720,267

(22) Filed: Dec. 19, 2012

(51) Int. Cl.
*G06Q 40/00* (2012.01)
(52) U.S. Cl.
USPC .............................................. 705/37; 705/38
(58) Field of Classification Search
USPC ..................................................... 705/35–40
See application file for complete search history.

(56) References Cited

U.S. PATENT DOCUMENTS

| | | | | |
|---|---|---|---|---|
| 7,769,950 B2 * | 8/2010 | Sih et al. | .................. | 711/118 |
| 7,890,299 B2 * | 2/2011 | Fok et al. | .................. | 702/187 |
| 8,284,802 B2 * | 10/2012 | Huang et al. | .................. | 370/474 |
| 8,443,147 B2 * | 5/2013 | Brewer et al. | .................. | 711/127 |

OTHER PUBLICATIONS

Morris, G. et al., "FPGA accelerated low-latency market data feed processing," *17th IEEE Symposium on High Performance Interconnects*, 2009, pp. 83-89, IEEE Computer Society.

* cited by examiner

*Primary Examiner* — Thu Thao Havan
(74) *Attorney, Agent, or Firm* — Fenwick & West LLP

(57) ABSTRACT

To improve the performance of a market data platform, a market data platform includes a hardware offload solution that allows received financial information to bypass the software portion of the platform and be written directly into memory. The hardware offload solution includes a field programmable gate array (FPGA) that takes over responsibility for some tasks that were previously performed in software. These tasks include performing line arbitrage on financial information feed pairs to ensure that an accurate copy of the financial information feed is obtained and stored in memory as quickly as possible. These tasks also include performing memory paging in order to allow financial orders to be stored and accessed in an efficient manner.

20 Claims, 7 Drawing Sheets

FPGA MEMORY PAGING

BACKGROUND

1. Field of Art

The present disclosure relates to the field of data processing platforms for financial market data.

2. Description of Related Art

In the financial industry, financial information vendors provide customers with up to date information on financial instruments such as stock, bonds, and options. Financial information vendors compete with each other by striving to provide large volumes of up-to-date, accurate data as quickly as possible. Improvements in information delivery delay on the order of fractions of a second can provide customers with valuable, actionable information.

In order to promptly deliver financial information to customers, a variety of market data platforms have been developed to provide real time delivery of financial information. The information delivered may include, for example, bid, offer, and trade information related to a variety of financial products. Market data platforms receive this data, process it, and output it to customers. Given the size of modern financial markets, market data platforms need to be able to handle large volumes of information without sacrificing speed or accuracy. To this end, existing market data platforms generally consist of one or more networked computers, each having one or more processors to process received data.

In existing market data platforms, each computer in the platform generally receives data from an external source through an interface such as a network interface card (NIC). A software driver controlling the NIC takes the data received by the NIC and hands it off to the operating system kernel. The operating system kernel passes the data to a market platform software application running in a user space. The market platform software stack processes the received data for accuracy and writes it to memory. Once the data has been written to memory, another portion of the market platform software may use it, for example by synthesizing the data and sending it to one or more customers contracted to receive the data.

As information volumes have increased and the tolerance for information delivery latencies have decreased, the processing requirements for market data platforms have increased. In existing systems, these requirements have been met by adding processing power to the market data platforms. This includes both networking additional computers together, as well as adding physical processors (or cores) to the individual machines that makes up the platform. While such a solution has worked well in the past, the cost of this solution is rapidly approaching the point where it is impractical to simply add processors or computers as performance requirements increase.

DETAILED DESCRIPTION

Figure 1:
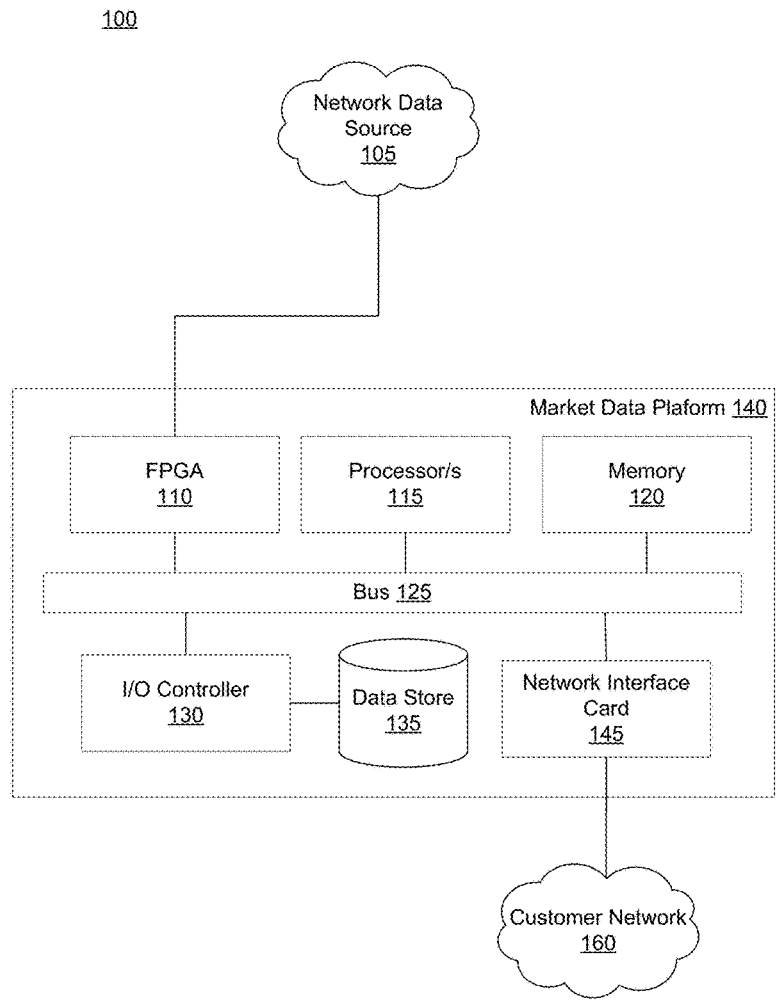
FIG. 1 is a functional diagram of a market data platform for processing financial information, according to one example embodiment.

The figures (FIGS.) depict various embodiments for purposes of illustration only. One skilled in the art will readily recognize from the following discussion that alternative embodiments of the structures and methods illustrated herein may be employed without departing from the principles described herein.

Configuration Overview

A market data platform includes a hardware offload solution that allows received financial information to bypass the software portion of the platform and be written directly into memory. The hardware offload solution includes a field programmable gate array (FPGA) that takes over responsibility for some tasks that were previously performed in software.

These tasks include performing line arbitrage on financial information feed pairs to ensure that an accurate copy of the financial information feed is obtained and stored in memory as quickly as possible. Offloading line arbitrage of the incoming feed decreases the processing load on the market data software and also decreases the amount of data that must be handled by the market data software. In one embodiment, this decreases latency on the order of approximately 50 microseconds, decreases processing load by approximately 30-40%., and decreases data input to the market data software by approximately 50%.

In addition to performing line arbitrage, the FPGA may also be configured to perform additional financial information processing. For example, the FPGA may be configured to perform decoding (e.g., FAST decoding) to decode incoming data that is encoded using a protocol (e.g., the FAST protocol). The FPGA may also be configured to perform symbol splitting (e.g., ITCH splitting) on encoded data to divy up an incoming feed into more manageable chunks, or to separate out requested data. For example, the FPGA may provide for ITCH splitting, which as a direct data-feed protocol, makes it possible for subscribers to track status of each order from a time it is first entered until a time it is either executed or canceled. The FPGA may also be configured to perform symbol filtering. By performing these operations on the FPGA versus performing them using the market data software, the market data platform is further able to accelerate performance, thereby decreasing overall latency between when data is received by the market data platform and when it is sent to customers.

The market data platform may also be configured to perform memory paging in order to provide rapid and reliable storage and access for financial orders. For example, the FPGA may be configured to work in conjunction with two or more tiers of memory to provide access financial order information. A tiered memory paging approach allows the market data platform to provide access to every stored financial order in a deterministic amount of time that is roughly equivalent for all financial orders, despite the size of the database, which may scale to sizes, for example, of 64 gigabytes and higher. This lowers the average time it takes to access any given financial order.

Market Data Platform Including a Line Arbitrage FPGA

FIG. 1 is a functional diagram of a market data platform 140 for processing financial feed information, according to one embodiment. The market data platform 140 receives one or more financial information feeds (or financial data streams) from one or more data sources 105 located on an external network. The market data platform 140 is configured to process the received financial feeds, and output data to customers 160, also located on an external network.

The network data source 105 includes one or more sources of financial information. These sources may include, for example, primary sources such as stock exchanges, bond indices, future markets, commodities markets, mutual fund indices, or other markets for other kinds of financial products. The sources may also include third party services that receive financial information from primary sources and output secondary information such as market statistics and financial projections.

Financial feeds arrive at the market data platform 140 in the form of a stream of packets. Each packet may contain one or more messages. The messages may, for example, represent new offers to buy or sell financial instruments, indicate completed sales of financial instruments, provide notification regarding corrections to previously reported sales of financial instruments, and provide administrative details related to financial instrument transactions. Financial instruments include tradable assets of any kind, including cash, evidence of an ownership or lien interest in an entity, or a contractual right to receive or deliver ownership of the same. Examples of financial instruments include stocks, bonds, commodities, and currency.

The feed information is sent at least in duplicate from the source 105 to the market data platform 140. Typically, this is accomplished by the data being transmitted from the source 105 in A/B line pairs to distinct market data platform 140 IP addresses and ports. This dual transmission of every line pair provides redundancy in the event one of the line pairs is lost during transmission. Redundant transmission of data, where both line pairs of a given piece of information are sent close together in time, helps increase the chance that at least a single copy of every piece of transmitted information is received by the market data platform as quickly possible.

Redundant transmission also decreases the need for retransmission or error correction coding, as all three techniques have a similar goal of ensuring data is received properly. Redundant transmission is preferable to error correction coding as error correction coding requires both encoding prior to transmission and decoding after transmission. As encoding and decoding takes both time and processing power, it is comparatively less efficient than redundant transmission. Redundant transmission is preferable to retransmission of missed packets due to the time and processing costs that would be associated with requesting and receiving missing packets. Further, the delay between when data would be identified as lost and when a new copy of the data could be obtained would be a prohibitively long time. In some cases, redundant transmission may be used in conjunction with retransmission to ensure that every single packet in the feed is received by the market data platform 140.

The market data platform 140 receives the incoming pairs of packets through a field programmable gate array (FPGA) 110. The FPGA 110 is configured to perform line arbitrage on the received pairs of packets in order to ensure that at least one copy of each transmitted packet has been received. Having processed the incoming packet streams, the FPGA 110 uses a direct memory access (DMA) to take control of bus 125 in order to write the messages inside the received packets directly to memory 120 without needing to interact or interface with the operating system kernel or any other software. Once the received messages have been written to memory 120, the FPGA 110 may communicate with the software running on the market data platform 140 via an interrupt to inform the software that the feed information is in memory 120.

In another possible embodiment for lower latency performance, the software would continuously poll the buffer waiting for new data. In another combined embodiment, the software can be configured to poll for a configurable time period, if no data is received it will sleep and wait for an interrupt to begin processing again.

In addition to the FPGA 110, the market data platform 140 includes computing components such as one or more processors 115, input/output controllers 130 for accessing a non-transitory computer readable storage medium 135, one or more buses 125 for transmitting data between parts of the platform 140, and a network interface card 145. The computing components are configured to operate a software computing environment including a software operating system. The software operating system is configured to operate market platform software that makes use of the feed information that has already been written to memory 120 by the FPGA 110. Generally, the market data software 140 reads the messages from memory 120, and processes them. In one embodiment, the market platform 140 then outputs the processed information to customers on an external network 160 using network interface card (NIC) 145. In another embodiment, rather than outputting the processed information to an external computer, the processed data is further used by the same computer.

Figure 2:
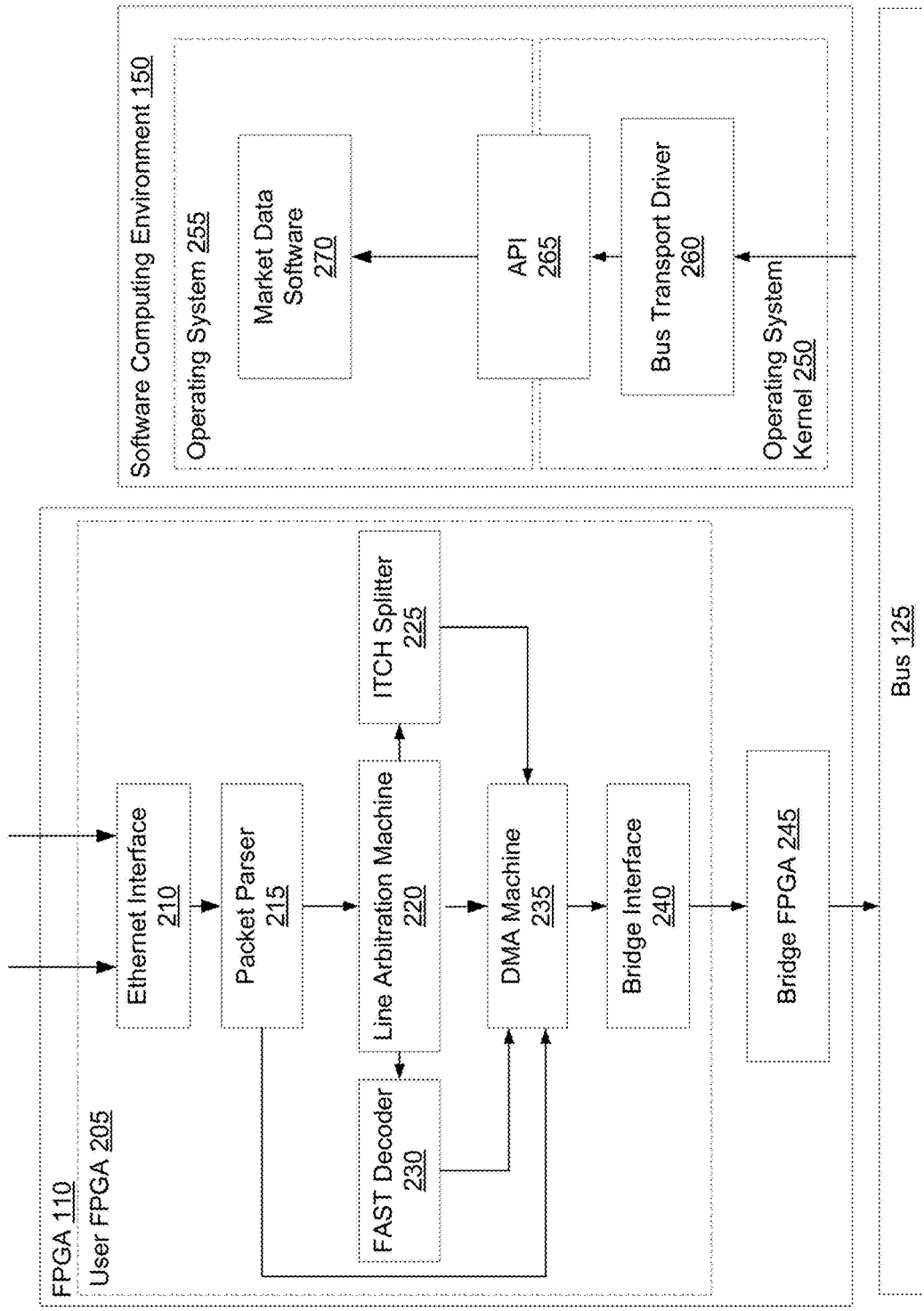
FIG. 2 is a functional diagram of a FPGA and a software computing environment of a market data platform interfacing through a bus, according to one example embodiment.

FIG. 2 is a functional diagram of a FPGA 110 and a software computing environment 150 of a market data platform 140 interfacing through a bus 125, according to one embodiment. Feed information is received directly by the FPGA 110 from an external network data source 105. In one embodiment, the FPGA 110 includes at least two portions: a user FPGA 205 and a bridge FPGA 245. In another embodiment, the user FPGA 205 and bridge FPGA 245 are integrated into a single FPGA.

The feed information, including both lines of feed data A and B, is received by the user FPGA 205 through a network interface such as ethernet interface 210. In other embodiments, the network interface may use another transmission protocol other than ethernet. In the case of an ethernet implementation, the ethernet interface 210 may comprise a number of different ports, each configured to receive one of the feed lines A/B from an internet address associated with the source 105. The ethernet interface outputs the received packets.

In one embodiment, the ethernet interface 210 includes two ports (not shown). Although both ports are operational, only one is connected to the complete data path downstream at a time. The selection of which port is operational is configured by market data software 270 external to the FPGA 110. In another embodiment, both ports are connected simultaneously. The ethernet interface 210 may further be configured to filter received packets. For example, the ethernet interface 210 may include a MAC filter table for filtering multicast groups. In one embodiment, the ethernet interface 210 includes an embedded GTX transceiver and a Tri-Mode ethernet MAC.

The packets received by the ethernet interface 210 are forwarded to a packet parser 215. The packet parser 215 is configured to parse the information contained within each packet. The packet parser 215 is configured to extract the sequence number of the packet, the messages included in the packet, the number of messages included in the packet, and the control packet type of the packet. The packet parser 215 may construct some of the extracted information into a header including metadata, for example, the sequence number, number of messages, and control packet type. The header also enables subsequent portions of the FPGA 110 handling the packet to make logic decisions regarding the packet without having to fully parse the packets themselves. The packet parser 215 may also be configured to timestamp data with the time that it is received from the ethernet interface 210. The timestamp may be added to the header as additional metadata.

The packet parser 215 is configured to instantiate one or more parsers for different types of financial information feeds. The packet parser 215 is configured to send packets to these parsers depending upon the control packet type. The parsers include, for example, a line arbitration machine 220, a DMA machine 235. Some parsers will then send data on to other parsers such as a Financial Information eXchange Adapted for STreaming (FAST) decoder 230 an ITCH (not an acryonym) splitter 225, an Unlisted Trading Privileges (UTP) parser (not shown), an Options Price Reporting Authority (OPRA) parser (not shown), and a Commodity Trading Advisors (CTA) parser (not shown), and a symbol filterer (not shown).

If a received packet is a stack packet or a bypass packet, the packet is passed directly the direct memory access (DMA) machine 235 so that it may be written to memory 120 as quickly as possible. Otherwise, the packet is sent to the line arbitration machine 220.

The line arbitration machine 220 is configured to perform line arbitrage to determine whether at least one copy of each data packet has been received. Each packet entering the line arbitration machine 235 has a sequence number that increments for each successive packet based on the number of packets included in the feed. The line arbitrage machine 220 checks the header to see if the sequence number for a particular packet is unique. Generally, a packet is considered to have been properly received if one packet with each sequence number has been received. If a duplicate sequence number is detected, then a copy of that packet has already been received and the duplicate packet with the same sequence number may be discarded.

For packets with sequence numbers that are not duplicates, the line arbitration machine 220 determines the physical memory location where the packet will be transferred in the memory 120. The line arbitration machine 220 further sets a DMA command type, and updates various counters that are read by the market data software 270 to check on the status of the received feed. The line arbitration machine 220 then communicates the packet and the DMA command type to the DMA machine 235 so that the packet may be written to memory 120. The rules governing the line arbitration process (i.e., the sequence number tracking of packets) is configurable at run time via a software API (application programming interface) 265.

The line arbitrage machine 220 may also be configured to check for sequence number gaps indicating that both packets of a given sequence number were not received. In the event a gap is detected, a group of received packets are buffered for a period of time to wait for the packet with the missing sequence number to arrive. The wait period may be a predetermined or variable timeout period. If a packet with the missing sequence number does not arrive within the timeout period, the line arbitration machines may transmit a notification to the market data software 270 that a gap event has occurred, and that some data from the feed is missing.

The line arbitration machine 220 also collects packets into arbitration groups that will be written together during a DMA write. The arbitration groups also specify where in memory 120 the packets of the arbitration groups will be written when the DMA write occurs. Collecting the packets into arbitration groups allows the DMA operation to skip the process of buffer mapping where packets would be buffered and mapped to sections of the memory 120. Ordinarily this buffering and mapping process would occur using CPU cycles, so by skipping this process, the efficiency of the DMA write process is improved and the resources required to perform the DMA write are lessened.

The line arbitration machine 220 may output to a symbol decoder such as a FAST decoder 230. Although described with respect to a FAST decoder 230, in practice any type of decoder may be used. FAST (or FIX Adapted for Streaming, where FIX stands for "Financial Information eXchange") is a data compression protocol developed to encode financial information for efficient dissemination over a computer network. The underlying FIX protocol is an open, industry-standard protocol for financial information transmission between entities. The FAST protocol was designed to optimize the FIX protocol for streaming environments, where financial information is being relatively continuously transmitted between a sender and a recipient. Traditionally, FIX messages have a relatively high overhead due to a message descriptor, which functions similarly to a packet header describing the contents of the message to be received. FAST eliminates overhead and improves efficiency as compared to FIX by transmitting the message descriptor separate from the messages, along with a number of other modifications.

For packets sent to the FAST decoder 230, the line arbitration machine 220 outputs processed packets, their headers and the DMA command type to the FAST decoder 230 rather than outputting the packets to the DMA machine 235. The FAST decoder 230 processes the messages contained in the packet to decode them into a more software friendly format. This may, for example, including unpacking coded messages that contain only a few characters into a longer form that is more easily read by market data software that will be reading the messages out of memory 120. Once the FAST decoder 230 has completed decoding the messages in a packet, the packet is passed to the DMA machine 235.

The FAST decoder 230 may convert messages into FIX messages, or the decoder 230 may convert messages into any other format that is convenient. For example, a compressed series of three messages included in a single packet may be "|10000|CLIENT1|20060126-13:06:58.100|1200|FOO||||200|10||||300|−20|BAR2|". If the messages are converted into FIX messages, the messages may appear after decoding as "8=FIX.4.4|34=10000|49=CLIENT1|52=20060126-3:06:58.100|44=1200|55=FOO1|8=FIX.4.4|34=10001|49=CLIENT1|52=20060126-3:06:58.200|44=1210|55=FOO1|8=FIX.4.4|34=10002|49=CLIENT1|52=20060126-3:06:58.300|44=1190|55=BAR2|". Alternatively, the FAST decoder 230 may separately label each field within each message. For example, for the first message above the FAST decoder 230 may convert the first message into a number of separate fields or key value pairs, including "BeginStr" and "FIX.4.4", "SeqNum" and "10000", "Sender ID" and "Client 1", "SendingTime" and "20060126-3:06:58.100", "Price" and "1200", and "Symbol" and "FOO1".

The line arbitration machine 220 may output to a symbol splitter, such as an ITCH splitter 225. Although described with respect to an ITCH splitter, any kind of splitter may be used. ITCH, similarly to FAST and FIX, is a protocol for splitting a single feed of financial information into multiple separate feeds. ITCH allows a recipient to make a query regarding a customer order for financial information, and ITCH sends the recipient a series of messages that track the life of a customer order. ITCH is an outbound market data feed only and does not support entry (i.e., creation) of new customer orders.

For packets sent to the ITCH splitter 225, the line arbitration machine 220 outputs processed packets, their headers and the DMA command type to the ITCH splitter 225 rather than outputting the packets to the DMA machine 235. The ITCH splitter 225 receives a single multicast feed and splits it into a number of sub-feeds that can be forwarded to other/different processes (e.g., DMA machine 235). Using an ITCH splitter is useful in instances where a single multicast feed includes more data than a single processor can handle. For example, a single feed can be split and processed in parallel by multiple processors. Once the ITCH splitter 225 has completed splitting the messages in a packet, the packet is passed to the DMA machine 235.

The DMA machine 235 receives packets and arbitration groups from one or more of the packet parser 215, the line arbitration machine 220, the FAST decoder 230, and the ITCH splitter 225. The DMA machine 235 sends the arbitration groups and packets to the bridge FPGA 245 to perform the DMA write to memory 120. The bridge FPGA 245 is configured to provide an interface with the bus 125 for communicating with the memory 120. In one embodiment, the Bridge FPGA 245 is configured to include a PCI-Express (PCIe) interface for communicating with the bus 125. The DMA write may be implemented by the bridge FPGA 245 in a number of ways.

In one embodiment, the bridge FPGA 245 may use the PCIe interface with the bus 125 to request control of the bus 125 in order to write to memory 120. Once control is obtained, the bridge FPGA 245 may perform write commands on the bus 125 to memory 120. In other embodiments, the bridge FPGA 245 may operate in conjunction with the processor/s 115 in a burst mode, a cycle stealing mode, or a transparent mode to perform the DMA write.

Depending upon the implementation, the DMA write may write data to any number of different locations within memory 120. By writing to more than one location in memory, the data written may be accessible to more than one software application running at any given time on platform 140.

The bridge FPGA may perform other functions in addition to the DMA write to memory 120. The bridge FPGA 245 is also configured to load the user FPGA 205 upon startup of the platform 140. The bridge FPGA 245 may also perform register reads and writes on both the user FPGA 205 and the bridge FPGA 245. The bridge FPGA 245 may also control a small form-factor pluggable device (SFP) for low speed interfaces.

Independently from the FPGA 110, the remainder of the platform 140 operates as a conventional computing architectures, for example, an "x86" (e.g., INTEL) or reduced instruction set computing (RISC) architecture computer. The platform 140 uses its components to implement a software computing environment 150 including a software operating system 255. The operating system includes a kernel 250 for interfacing with the remainder of the hardware portions of the platform 140 through bus 125. On top of the kernel, the operating system 255 may be configured to implement market data software 270. The kernel 250 makes available one or more APIs 265 for the market data software 270 to make use of to access the underlying hardware components of the platform 140. The APIs 265 interact with a bus transport driver 260 and other hardware drivers (not shown) to operate the underlying hardware components of the platform 140.

The market data software 270 uses one or more APIs 265 to control a bus transport driver 260 in order to access the memory 120 storing the financial data messages stored there by the bridge FPGA 245. The market data software 270 therefore does not access the received feed information until after it has been written via DMA to the memory 120. Further, through the use of the FPGA 110 and DMA, the feed information does not pass through any portion of the software computing environment 150 before entering memory 120. This decreases the latency of the line arbitration process, and decreases the amount of memory and software resources required to perform line arbitration on received feed information. In one embodiment, a latency improvement of ~50 μs can be obtained when using the FPGA 110 to perform a DMA write to memory 120 versus receiving feed data through a NIC, sending the received data through a software stack to a line arbitrage software module, and writing to memory 120 after line arbitration has been performed by the software module.

One of the APIs 265 available to the market data software 270 may be a FPGA control API (not shown) that is configured to monitor and control the FPGA 110. Various components of the FPGA 110, for example the line arbitration machine 220 and DMA machine 235, may be configured to make available statistics and write to memory information that is accessible by the FPGA control API. For example, the line arbitration machine 220 may relatively continuously update one or more counters as the feed is received and processed. This counter may be monitored by the FPGA control API. The FPGA control API may also be used to control which feeds the ethernet interface 210 is subscribed to.

Figure 3:
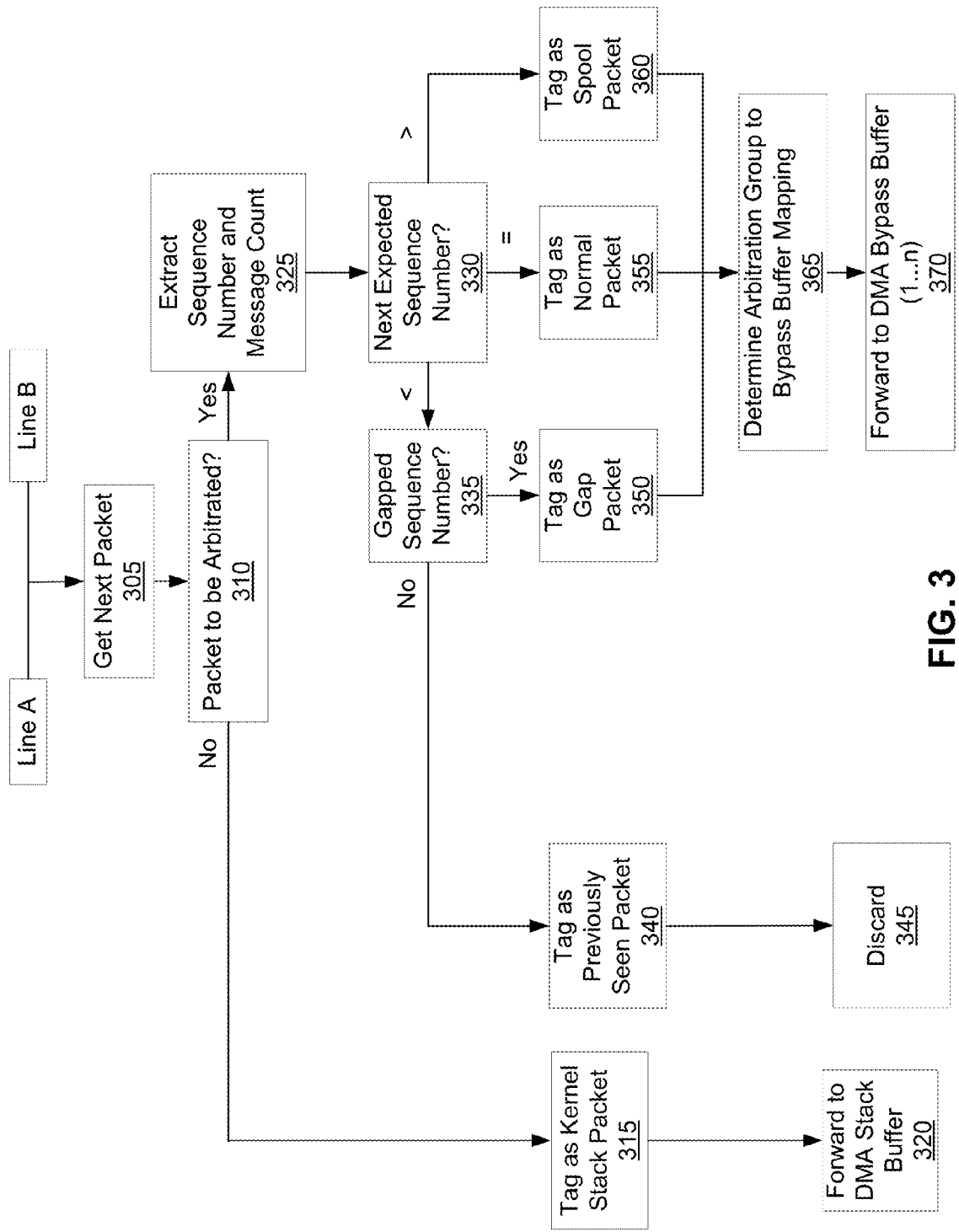
FIG. 3 is a flowchart for performing line arbitrage using a line arbitrage FPGA, according to one example embodiment.

FIG. 3 is a flowchart for performing line arbitrage using an FPGA 110, according to one example embodiment. At least two lines A and B of a financial information feed are received at an ethernet interface 210 of user FPGA 205. The packet parser 215 receives packets 305 from the ethernet interface 210. Using a single packet as an example, the packet parser 215 determines whether the packet is to be arbitrated 310. If the packet is not to be arbitrated, the packet is tagged as a kernel stack packet 315. The packet is then forwarded to a DMA stack buffer 320 to await writing to a stack buffer portion of memory 120 by bridge FPGA 245.

If the packet is to be arbitrated, the packet parser 215 parses 325 the sequence number of the packet, as well as the number of messages included in the packet. This information is passed along with the packet to the line arbitration machine 220. The line arbitration machine 220 compares 330 the sequence number of the packet to the sequence number of the last packet it received. The line arbitration machine 220 expects to receive a packet with a sequence number that is an integer value at least one higher than the sequence number of the previous packet it received.

If the sequence number of the current packet is less than expected 335, then the packet falls into one of two categories. If the sequence number of the packet matches the sequence number of an already received packet, then the packet is tagged as a previously seen packet 340, and is discarded 345 as an inessential duplicate of the previously received packet. However, if the sequence number does not match the sequence number of any previously received packet, or alternatively matches the sequence number of one of the gaps in sequence numbers of received packets, then the packet is tagged as a gap packet 350.

If the sequence number of the packet is equal to the expected value of the sequence number for that packet, then the packet is tagged as a normal packet 355. If the packet's sequence number is greater than expected, then the packet is tagged as a spool packet 360.

Gap packets 350, normal packets 355, and spool packets 360 are processed to determine an arbitration group 365 for each packet. The arbitration group allows these types of packets to bypass buffer mapping during the DMA write. Once the arbitration group is determined, the packet is sent to a DMA bypass buffer (not shown), thereby reducing the delay prior to writing. Via a DMA write, the packet is written directly to memory 120. Market data software 270 may be notified when the DMA write to memory 120 has been performed (not shown).

Figure 4A:
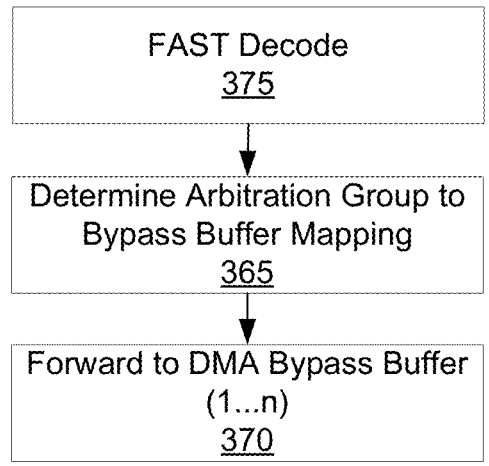
FIG. 4A is a flowchart for incorporating FAST decoding into line arbitrage using a line arbitrage FPGA, according to one example embodiment.
Figure 4B:
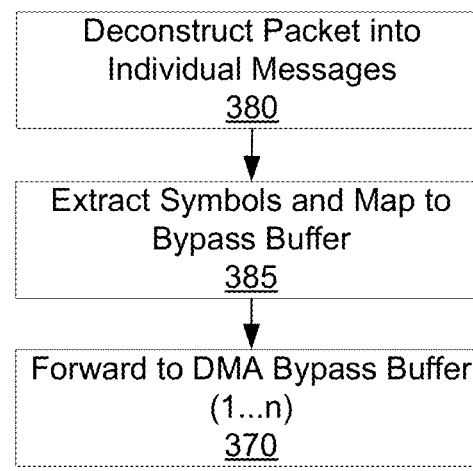
FIG. 4B is a flowchart for incorporating symbol splitting into line arbitrage using a line arbitrage FPGA, according to one example embodiment.

FIGS. 4A and 4B illustrate alternate embodiments with different steps after packets have been tagged as gap 350, normal 355, and spool 360 packets but before packets have been written to memory 120. FIG. 4 is a flowchart for incorporating FAST decoding into line arbitrage using a line arbitrage FPGA, according to one embodiment. In FIG. 4A, prior to determining an arbitration group 365 for gap, normal, and spool packets, each packet is processed using FAST decoding 375. After FAST decoding has been completed, the arbitration group for each packet is determined 365. The arbitration groups are then forwarded 370 to a DMA bypass buffer (not shown).

FIG. 4B is a flowchart for incorporating symbol splitting into line arbitrage using a line arbitrage FPGA, according to one embodiment. In FIG. 4B, for packets that have been tagged as gap, normal, or spool packets, the packets are deconstructed to obtain the messages that make up the packet. For each message in the packet, the symbols that make up the message are extracted and mapped to the bypass buffer 385. The bypass buffer is then forwarded 370 to a DMA bypass buffer to be written to memory 120. Overall, this has the effect of splitting the messages and packets so that they are placed in different parts of the bypass buffer and, ultimately, memory 120.

Memory Paging Using the FPGA

Figure 5:
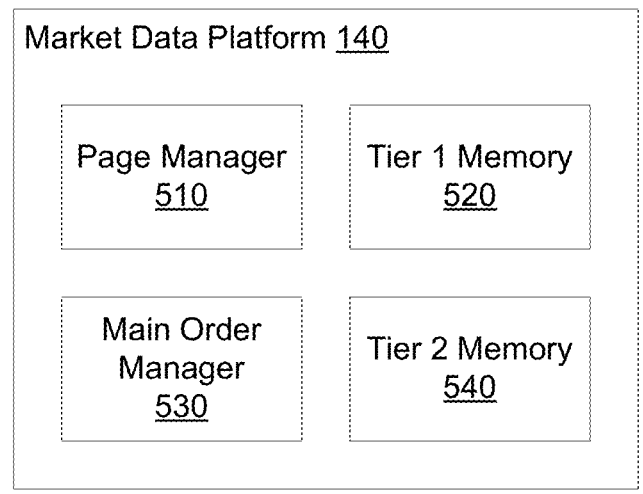
FIG. 5 is a block diagram of a market data platform configured to perform memory paging in order to store and access data, according to one embodiment.

FIG. 5 is a block diagram of a market data platform 140 configured to perform memory paging, according to one embodiment. The market data platform 140 is configured to perform memory paging so that the market data platform 140 is able to rapidly store and access very large amounts of financial order data. The market data platform 140 includes a page manager 510, a main order manager 530, a first tier (tier 1) of memory 520, and a second tier (tier 2) of memory 540. In some implementations, the market data platform may include additional tiers of memory (not shown).

The page manager 510 generates an order high segment from an order identifier in a received message. The page manager searches the tier 1 memory 520 to identify a page index mapped to the order high segment. The page index corresponds to a page in the tier 2 memory identify where the financial order is to be stored or acted upon. The page manager 510 is also configured to use the tier 1 memory 520 to manage the opening and closing of pages of tier 2 memory 540 used for storing financial orders. The page manager 510 is implemented in FPGA 110.

The main order manager 530 is configured to use the page index obtained by the page manager 510 and an order low segment of the order identifier to create a second tier memory address. The second tier memory address specifies where to store and access a financial order within a page in the tier 2 memory 540. The main order manager 530 is also implemented in the FPGA 110.

The tier 1 memory 520 stores a set of mappings between the order high segments of order identifiers and page indices associated with pages in the tier 2 memory 540. Each order high segment is associated with a single page index. Each page index refers to a single page of memory in the tier 2 memory 540.

The tier 2 memory 540 stores financial orders in a number of different pages. These pages may, for example, be virtual pages maintained generally by the FPGA 110, where each page is a contiguous block of physical memory having a starting memory address and an ending memory address. Each page in tier 2 memory 540 stores all of the financial orders that share the same order high segment. Within each page in the tier 2 memory 540, each individual financial order is addressed in memory with a second tier memory address, which is described further below. In one embodiment, the size of each page in tier 2 memory 540 is substantially equal to the number of order identifiers that share a single order high segment multiplied by the amount of memory used to store each financial order, including the second tier memory address.

The tier 1 memory 520 is relatively small in size in comparison to the tier 2 memory 540. This is because the tier 1 memory 520 stores only mappings between page indices and order high segments, in contrast to the tier 2 memory, which stores all of the financial orders. For example, in an implementation where the order identifier is 40 bits, the tier 1 memory 520 is approximately 196 kilobytes in size. A memory of this size can be quickly and easily searched using any known technique. In this same example, the tier 2 memory 540 is approximately 68 gigabytes in size. In one embodiment, the page size is 16 megabytes at both tiers. In another embodiment, the page size varies between tiers, based on how the order identifier is split. Page size is selected to avoid large, sparsely populated pages, and instead use pages that are filled as completely as possible as often as possible, on average.

The tiers of memory 520 and 540 are implemented using physical memory associated with the FPGA 110 and/or using the memory 120 of the market data platform 140. The physical memory in the FPGA 110 and/or the memory 120 may include, for example, random access memory (RAM) and certain kinds of read only memory (ROM) such as electrically erasable programmable ROM (EEPROM) and flash memory. In the event that RAM is used to implement the physical memory, different kinds of RAM may be used, including block RAM (BRAM), static RAM (SRAM), and dynamic RAM (DRAM). The physical memory may be located "on chip" with the FPGA 110 along with the page manager 510 and main order manager 530. This may be the case for BRAM for example. Alternatively, the physical memory may be "off chip," for example as part of memory 120 of the market data platform 140 that is accessed by the FPGA 110 through bus 125. This may be the case for SRAM and DRAM, for example.

Operation

Figure 7:
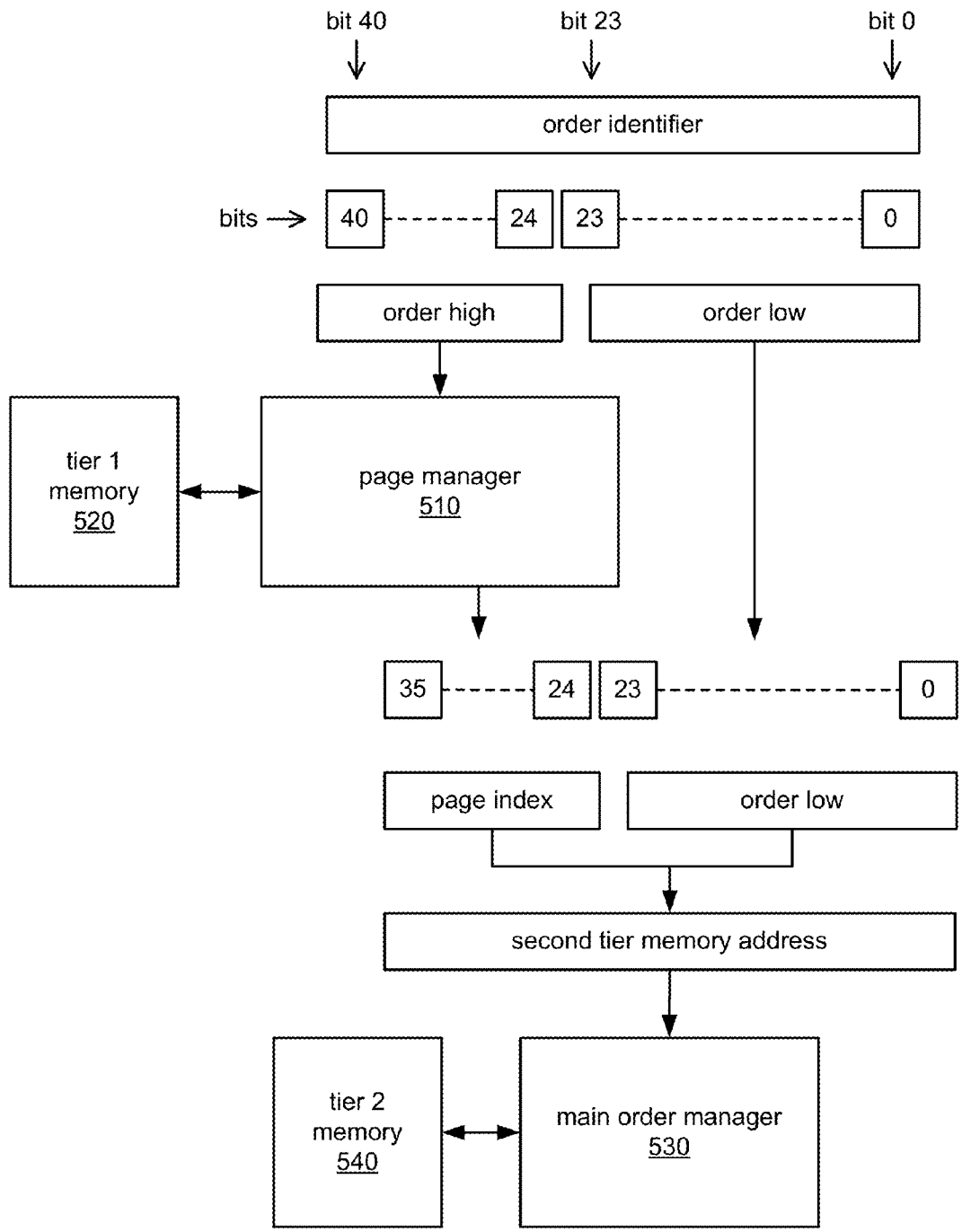
FIG. 7 visually illustrates memory paging using the components of the market data platform, according to one embodiment.

Jumping to FIG. 7, FIG. 7 visually illustrates an example memory paging using the components of the market data platform 140. The components of the platform 140 described in FIG. 5 are described further below in relation to the illustration in FIG. 7.

The page manager 510 is configured to receive data messages of, for example, financial orders. The messages may be received from external sources, for example from a financial data feed. In one implementation, the received messages are first processed using the line arbitrage portion of the FPGA 110 described above. The messages include financial order information, an order identifier for the financial order, and an action to be taken with respect to the financial order information.

The financial order information may, for example, indicate that a party has a quantity stock, bonds, or options for sale a certain price. The financial order information may also include a time that the order was created, and other identifying information.

The order identifier is a piece of data that uniquely identifies the financial order. The platform 140 uses the order identifier to determine where to store a new financial order in memory, as well as to locate a financial order that has been previously stored in memory. Each message's order identifier is unique. However, many messages will share identical segments of the order identifier. The market data platform 140 makes use of the shared commonality between segments of order identifiers to facilitate the rapid storage and access of financial orders.

The order identifier of a message may be provided by the source from which the message was received. Alternatively, the order identifier may be assigned and added to the message by the platform 140. For example, the FPGA 110 may sequentially assign each received message an order identifier in the order the messages are received.

The size of the order identifier determines how many financial orders can be stored and accessed by the market data platform 140. In one implementation, the order identifier is anywhere from 8 to 256 bits long, or 8 bits to 64 bits long, inclusive. For example, a 40 bit order identifier allows for the unique identification of approximately 1 trillion orders.

The actions that may be taken with respect to a financial order include creating (or adding) a new financial order to be stored by the platform 140, reading the data of a previously stored financial order, updating a previously stored financial order, or deleting a financial order from storage. Collectively, these different "types" of order actions are referred to as CRUD (create, read, update, delete) operations.

Referring back to page manager 510, for a received message the page manager 510 is configured to access the tier 1 memory 520 to determine where in the tier 2 memory 540 a financial order associated with the message is or will be stored. To do this, the page manager 510 divides the order identifier into a first identifier segment (or "order high" segment) and a second identifier segment (or "order low" segment). The order high segment is common to a number of other order identifiers.

The page manager 510 searches the tier 1 memory 520 to obtain the page index corresponding to the order high segment. If the page manager 510 finds a page index corresponding to the order high segment, the page manager 510 sends the obtained page index to the main order manager 530 to perform the action specified in the message.

In some instances, however, the page manager 510 will be unable to find a page index in the tier 1 memory 520 that matches the order high segment. When this occurs, if the action in the message specifies that the message contains a new financial order to be stored, the page manager 510 is configured to create a new mapping between an unassigned page and page index from the tier 2 memory 540, and the unmatched order high segment. The unassigned page may be obtained from a memory stack, for example. The creation of a new mapping between an unassigned page, page index, and an order high segment may be referred to as assigning or "opening" of a page. Thus, the page manager 510 is configured to control the allocation of pages in the tier 2 memory in order to store received financial orders. Responsive to being opened, the newly assigned page is capable of being filled with financial orders that also have the same order high segment. After opening the new page, the page manager 510 communicates the new page index to the main order manager 530.

When a new page will be opened depends upon how order identifiers are assigned. In an example case where order identifiers are assigned sequentially as messages arrive, most messages will have the same order high segment as the previous message. Consequently, they will have the same page index as the prior message. However, as order identifiers increment, some messages will have a new order high segment that does not match the prior order high segment. This may be the case because the previous page of tier 2 memory 540 has already been "filled" by earlier arriving financial orders. The opening of a new page assigns a new space in the tier 2 memory where arriving financial orders may be stored.

The main order manager 530 receives the page index and the order low segment from the page manager 510 to generate a second tier memory address that identifies exactly where in the page of tier 2 memory 540 the financial order is or will be stored. The main order manager 530 generates the second tier memory address by combining the page index and the order low segment. For example, in one embodiment the main order manager 530 concatenates the page index and order low segment to create the second tier memory address.

The main order manager 530 performs the action specified in the message at the second tier memory address at the page specified by the page index in the tier 2 memory 540. If the action is to store a new financial order, the main order manager 530 transmits the financial information to be stored. If the action is to update an existing financial order, the main order manager 530 transmits the updated financial information to be stored. If the action is to read the stored financial order, the main order manager 530 obtains the financial order information from the tier 2 memory 540.

If the action is to delete a stored financial order, the main order manager 530 is configured to delete the financial order information from the tier 2 memory 540. This may be accomplished by physically changing the bits in memory 540 that previously corresponded to the financial order information. Alternatively, this may be accomplished by changing a marker bit indicating whether data is stored for that particular address.

With further regard to financial order deletion, the page manager 510 is also configured to maintain a count of how many financial orders are presently stored in each page of the tier 2 memory 540. The number of active financial orders for each page may be stored in the tier 1 memory 520 alongside each page index, the page it corresponds to, and the corresponding order high segment. For example, the number of active financial orders for a page may be an integer counter that increments every time a message is received to add a new financial order to a page. The counter may be decremented every time a message is received to delete a financial order from the page. If the counter associated with a given page and page index reaches zero, the page manager 510 determines that the corresponding page has no financial orders stored in it. When this occurs, the page manager 510 is configured to delete the mapping between the page index and the order high segment. This frees (or "closes") the page and page index to be reassigned to a new order high segment. The closed page may be added to a memory stack containing the other unassigned pages of the tier 2 memory 540.

If financial orders are deleted at least roughly according to when they are received, then as time progresses pages will be opened, filled with financial orders, eventually emptied of financial orders, and then "closed" for reassignment and reuse with newly arriving financial orders. However, it is expected that there will occasionally be "orphan" financial orders for which no delete message is received. If left unchecked, these orphans would hold "open" otherwise empty pages that would be better utilized if they were filled with newly arriving financial orders.

In one implementation, the platform 140 is further configured reserve one or more orphan pages in the tier 2 memory 540. The page manager 510 is configured to occasionally perform a sweep of the tier 1 memory 520 to identify page indices where the count of the number of active financial orders is below a threshold. If the count for a page is below a threshold, the financial orders for that page are moved to an orphan page. Additionally, the mapping between the page index for that page and the order high segment is removed from the tier 1 memory 520, thereby closing the page for reuse.

In one implementation, orphan page is stored in a content addressable memory (CAM). In other kinds of memory, an address and a read/write command are provided to read or write accordingly at the location in memory specified by the address. In contrast, with a CAM memory the data field is provided as input, and the CAM returns the address (if any) that the data field is stored at. CAM memory is suited for storing small amounts of data, and thus is well suited to store the orphan orders that will generally be relatively few in overall size compared to the rest of the order processed by the platform 140. Using CAM memory is one way to improve the efficiency of accessing the orphan orders.

Subsequently, messages may be received relating to those orphaned financial orders. The page manager 510 is configured to determine which received messages correspond to the orphaned financial orders. For example, the page manager 510 may determine that a message corresponds to an orphaned financial order if a message has an action type of update, delete, or read, and if the order high segment of the order identifier does not correspond to any page index in the tier 1 memory 520. Responsive to determining that the message is related to an orphaned financial order, the main order manager 530 performs the action specified in the message at the location in the orphaned page where the financial order is stored.

The use of memory paging and tiered memory structures increases the speed at which data may be accessed and stored. Implementing memory paging in the FPGA 110 particularly, as opposed to in software, for example, further increases the speed at which data may be accessed and stored.

For small amounts of small stored data, memory paging may not provide significant performance gains. The market data platform 140, however, is configured to store a large amount of data where any individual item of data (e.g., a financial order) may need to be accessed quickly. In one embodiment of platform 140 using on-chip BRAM for tier 1 memory and external RLDRAM for tier 2 memory, it takes approximately 40 nanoseconds to retrieve the first frame of data for a given order identifier. Although the overall memory capacity would be multiple gigabytes, each individual read would typically be for a small amount of data. ITCH splitting for example only needs to read a single byte so the total read time would be less than 50 nanoseconds.

In contrast, existing data storage systems cannot provide access to large amounts of data within this time frame for ordered identifiers that increment, at least approximately, in sequence. Existing data storage systems generally use software running on a computing system in order to provide data access and storage. These software based solutions may, for example, use hashing algorithms or tree based lookup algorithms in order to access individual items of stored data. Hashing algorithms and tree based lookup algorithms can vary in the amount of time it takes to provide access to any given item of stored data. Some items of information will be accessed quickly, whereas others will take a great deal of time to be accessed. The possibility of this kind of slow data access performance makes software based solutions less practical for circumstances where fast and reliable data access is needed.

Example Process

Figure 6:
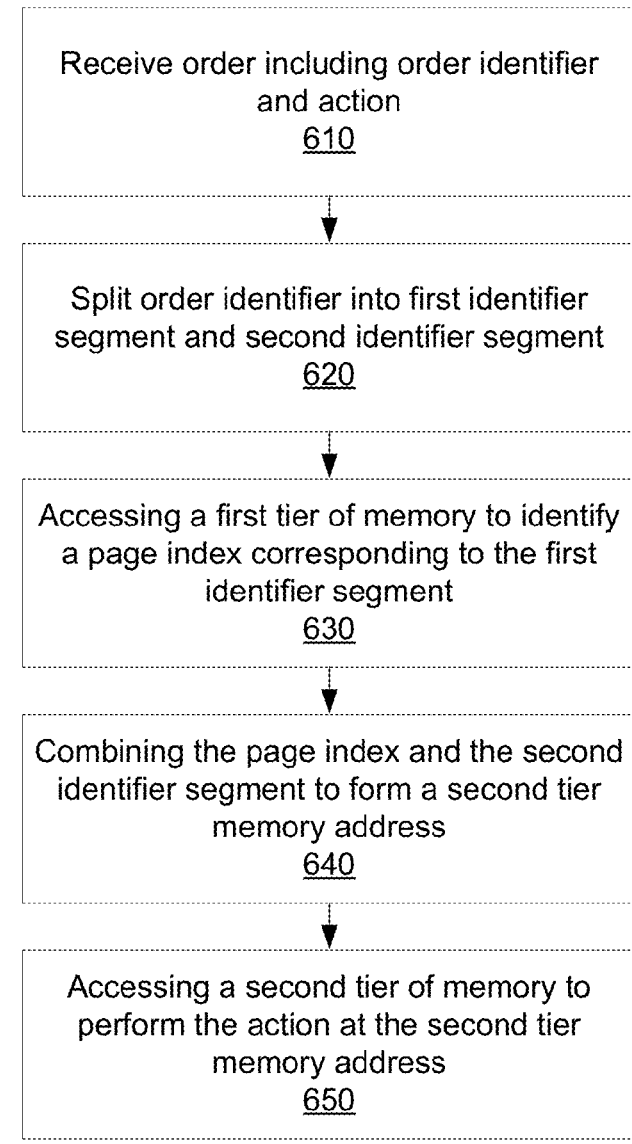
FIG. 6 is a flowchart for performing memory paging, according to one embodiment.

Referring back to FIG. 6, FIG. 6 illustrates a flowchart for performing memory paging, according to one embodiment. The page manager 510 receives 610 a message containing information regarding a financial order, an order identifier, and an action to take with respect to the financial order. The page manager 510 splits 620 the order identifier into a first identifier segment and a second identifier segment. The page manager 510 access a first tier of memory 520 to identify a page index corresponding to the first identifier segment.

The main order manager 530 combines 640 the page index and the second identifier segment to form a second tier memory address. The main order manager 530 access 650 the second tier memory address in a page of the second tier of memory 540. The main order manager 530 performs the action specified by the message at the second tier memory address.

Additional Tiers of Memory

In one implementation, the market data platform 140 includes three or more tiers of memory. Any additional tiers of memory beyond the first two tiers are similar in structure and function to the tier 1 memory 520 as described above. That is, the additional tiers of memory contain mappings between the previous tier of memory and pages in the subsequent tier of memory. Regardless of the number of tiers memory present, the first and last tiers of memory function similarly to the first 520 and second 540 tiers of memory from the embodiments described above.

In one embodiment, the platform 140 includes three tiers of memory. In this embodiment, rather than breaking order identifiers down into two segments, the order identifiers are broken into three parts, a beginning segment, a middle segment, and an end segment. The first tier of memory 520 includes mappings between the beginning segment of the order identifier and a page index in the third (i.e., intermediate) tier of memory. Each page in the third tier of memory contains mappings for all of the financial orders who have the same beginning segment of the order identifier. The mappings in each page of the third tier of memory are mappings between the middle segment of the order identifier and a page index in the second tier of memory 540.

The page manager 510 uses the first 520 and third tiers of memory to manage which pages of memory are open or closed in the second tier of memory 540. The main order manager 530 uses the second tier of memory 540 to perform actions specified in messages regarding received financial orders. However, in this case the main order manager 530 uses the end segment of the order identifier to generate the second tier memory address.

The additional tiers of memory allow the market data platform to take advantage of different types of memory that may be available to the market data platform 140. For example, in one embodiment, three different tiers of memory are implemented in three different types of physical memory available to the FPGA 110, including BRAM, SRAM, and DRAM. The first tier of memory 520 is located in the BRAM. The BRAM is located on the FPGA 110 chip, and has low amount of latency and low memory density. Because the first tier of memory 520 is the most frequently accessed portion of memory but is also relatively small in size, it is well suited to take advantage of the low latency and low density provided by the BRAM.

The second tier of memory is located in the SRAM. The SRAM is located off of the FPGA 110 chip, has a medium amount of latency, and a medium memory density. Because the second tier of memory is accessed an intermediate amount relative to the first tier of memory 520, it is well suited be implemented in the SRAM. The third tier of memory 540 is located in the DRAM. The DRAM is located off of the FPGA 110 chip, has a high amount of latency and a high memory density. Because the second tier of memory 540 is accessed the least frequently but stores the most information (e.g., the financial orders), it is well suited to be implemented in the DRAM. Aligning the tiers of memory to the capabilities of the physical memory improves the performance of the market data platform 140. In other embodiments, the tiers of memory may be implemented in any kind of physical memory.

Additional Considerations

The foregoing description of the embodiments have been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments in terms of algorithms and symbolic representations of operations on information, for example, the processes noted in FIGS. 3, 4a and 4b. These algorithmic descriptions and representations are commonly used by those skilled in the data processing arts to convey the substance of their work effectively to others skilled in the art. These operations, while described functionally, computationally, or logically, are understood to be implemented by computer programs, configurable electrical circuit hardware (e.g., FPGAs), dedicated electrical circuits, or the like. Furthermore, it has also proven convenient at times, to refer to these arrangements of operations as machines, interfaces, decoders, splitters, and environments (collectively, functional modules), without loss of generality.

Any of the steps, operations, or processes described herein with respect to the FPGA 110 may be performed as described in the disclosed functional modules. The functional modules may be combined into fewer modules, or separated into more functional modules. Similarly, more than one FPGA 110 may be used to perform the steps, operations or processes described as being performed by the FPGA 110. The software computing environment 150 may be implemented with a computer program product comprising a computer-readable storage medium containing computer program code, which can be executed by a computer processor 115 for performing any or all of the steps, operations, or processes described. Furthermore, the platform 140 referred to in the specification may include a single processor 115 or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon.

What is claimed is:

1. A field programmable gate array (FPGA) for processing received financial orders, comprising:
    a page manager configured to:
        receive a message including a financial order, an order identifier, and an action to take with respect to the financial order,
        segment the order identifier into a first identifier segment and a second identifier segment, and
        access a first tier of memory to identify a page index corresponding to the first identifier segment; and
    a main order manager configured to:
        combine the page index and the second identifier segment into a second tier memory address, and
        access a second tier memory address in a page in the second tier of memory corresponding to the page index to perform the action with respect to the financial order.

2. The FPGA of claim 1, wherein the page manager, in response to failing to identify the page index corresponding to the first identifier segment, is further configured to:
    determine that the action is to add a new financial order to be stored; and
    map, in the first tier of memory, the first identifier segment with an unassigned page index corresponding to an unassigned page in the second tier of memory.

3. The FPGA of claim 1, wherein the page manager is further configured to:
    determine that the action is a delete action;
    determine that the page index has only a single active order; and
    remove a mapping from the first tier of memory between the page index and the first identifier segment to make the page available on a memory stack of the second tier of memory.

4. The FPGA of claim 1, wherein the first tier of memory comprises a counter indicating a number of active orders in each page in the second tier of memory.

5. The FPGA of claim 4, wherein the page manager is further configured to:
    increment the counter responsive to determining that the action is to add a new financial order to be stored.

6. The FPGA of claim 4, wherein the page manager is further configured to:
    decrement the counter responsive to determining that the action is to delete a stored financial order.

7. The FPGA of claim 1, wherein the main order manager is further configured to:
    determine that the action is to delete a stored financial order; and
    delete the order from the second tier of memory at the second tier memory address.

8. The FPGA of claim 1, wherein the main order manager is further configured to:
    determine that the action is to add a new financial order to be stored; and
    store the financial order to the second tier of memory at the second tier memory address.

9. A method for processing received financial orders by using a field programmable gate array (FPGA), comprising:
    receiving a message including a financial order, an order identifier, and an action;
    segmenting the order identifier into a first identifier segment and a second identifier segment;

accessing a first tier of memory to identify a page index corresponding to the first identifier segment;

combining the page index and the second identifier segment into a second tier memory address; and accessing a second tier memory address in a page in the second tier of memory corresponding to the page index to perform the action with respect to the financial order.

10. The method of claim 9, wherein responsive to failing to identify the page index corresponding to the first identifier segment:

determining that the action is to add a new financial order to be stored; and mapping, in the first tier of memory, the first identifier segment with an unassigned page index corresponding to an unassigned page in the second tier of memory.

11. The method of claim 9, comprising:

determining that the action is a delete action;

determining that the page index has only a single active order; and removing a mapping from the first tier of memory between the page index and the first identifier segment to make the page available on a memory stack of the second tier of memory.

12. The method of claim 9, comprising:

for each page index, determining a number of active orders for that page index;

responsive to the number of active orders for a given page index being below a threshold, moving the financial orders of that page index from the second tier memory to an orphan page; and removing the mapping from the first tier of memory between the given page index and the first identifier segment to make the page available on a memory stack of the tier of memory.

13. The method of claim 9, wherein the first tier of memory comprises a counter indicating a number of active orders in each page in the second tier of memory.

14. The method of claim 13, comprising incrementing the counter responsive to determining that the action is to add a new financial order to be stored.

15. The method of claim 13, comprising decrementing the counter responsive to determining that the action is to delete a stored financial order.

16. The method of claim 9, comprising:

determining that the action is to delete a stored financial order; and deleting the order from the second tier of memory at the second tier memory address.

17. The method of claim 9, comprising:

determining that the action is to add a new financial order to be stored; and storing the financial order to the second tier of memory at the second tier memory address.

18. A field programmable gate array (FPGA) for processing received financial orders, comprising:

a means for receiving a message including a financial order, an order identifier, and an action;

a means for segmenting the order identifier into a first identifier segment and a second identifier segment;

a means for accessing a first tier of memory to identify a page index corresponding to the first identifier segment;

a means for combining the page index and the second identifier segment into a second tier memory address; and a means for accessing a second tier memory address in a page in the second tier of memory corresponding to the page index to perform the action with respect to the financial order.

19. The FPGA of claim 18, wherein the FPGA, in response to failing to identify the page index corresponding to the first identifier segment, further comprises:

a means for determining that the action is to add a new financial order to be stored; and a means for mapping, in the first tier of memory, the first identifier segment with an unassigned page index corresponding to an unassigned page in the second tier of memory.

20. The FPGA of claim 19, comprising:

a means for determining that the action is a delete action;

a means for determining that the page index has only a single active order; and a means for removing a mapping from the first tier of memory between the page index and the first identifier segment to make the page available on a memory stack of the second tier of memory.

* * * * *